United States Patent [19]

Affinito

[11] 3,745,478

[45] July 10, 1973

[54] DIFFERENTIAL AMPLIFIER WITH VARIABLE OUTPUT VOLTAGE BIAS

[75] Inventor: Frank J. Affinito, Ridgefield, Conn.

[73] Assignee: International Business Machines Corporation, Armonk, N.Y.

[22] Filed: May 27, 1971

[21] Appl. No.: 147,487

[52] U.S. Cl. .................... 330/30 D, 330/13, 330/22, 330/26

[51] Int. Cl. .............................................. H03f 3/68

[58] Field of Search ........................ 330/9, 13, 30 D, 330/69, 22, 26

[56] References Cited

UNITED STATES PATENTS

| | | | |
|---|---|---|---|
| 3,530,396 | 9/1970 | Rudolph | 330/69 |
| 3,356,961 | 12/1967 | Sedlmeyer | 330/69 |

*Primary Examiner*—Roy Lake
*Assistant Examiner*—Lawrence J. Dahl
*Attorney*—Hanifin & Jancin and John A. Jordan

[57] ABSTRACT

A differential amplifier arrangement with variable output voltage bias, which bias is continuously variable over the full amplifier output voltage range with bias settings being unaffected by nor disturbing the closed-loop gain setting. In addition, the input common-mode voltage range and the common-mode rejection ratio remain unchanged with bias settings. The variable output voltage bias arrangement employs a pair of networks each including a potentiometer and current source arranged in the amplifier feedback loop, such that one current source acts to insert current to provide the desired output voltage bias while the other current source acts to extract substantially all of the inserted current provided by the first source.

8 Claims, 2 Drawing Figures

PATENTED JUL 10 1973 3,745,478

INVENTOR
FRANK J. AFFINITO

BY John A. Jordan
ATTORNEY

DIFFERENTIAL AMPLIFIER WITH VARIABLE OUTPUT VOLTAGE BIAS

BACKGROUND OF THE INVENTION

The present invention relates to a differential amplifier arrangement, and more particularly to a differential high gain d.c. coupled amplifier arrangement with variable output voltage bias.

It is often necessary, or at least convenient, to develop the output signal, $E_o$ from a differential amplifier arrangement, around an operating point other than zero. Various techniques have been developed to bias the output voltage to a point other than zero. For example, a simple d.c. battery or, alternatively, a Zener diode arrangement may be employed to bias the output voltage, when the bias-plus-range of the output is still within the output range of the amplifier. An arrangement akin to this is shown and described on page 22 of the Philbrick/Nexus Applications Manual for Operational Amplifiers, second edition, June 1968, in an article entitled "Biasing the Output Voltage" (I. 24). Likewise, other forms of circuitry may exist for biasing the output voltage.

One of the difficulties with known techniques for biasing the output voltage exists in the fact that the magnitude or level of the output bias is not continuously variable, if variable at all, over the full amplifier output voltage range. Thus, when need requires the output voltage bias to be adjusted or altered, in accordance with the particular application, considerable difficulty may be encountered since an adjustment or change in the level of the output bias may require the use of new bias elements, or, in the worst case, another amplifier. Where adjustments can be made in the existing bias elements, some difficulty is encountered due to the fact that such adjustments may cause changes in any one or all of the closed-loop gain settings, the input common-mode voltage range and the common-mode rejection ratio. The essential drawbacks, however, in existing output voltage biasing techniques reside in the fact that the output voltage is not continuously variable over the full amplifier output voltage range, and further in the fact that any changes or adjustments required to be made in the closed-loop gain of the amplifier system itself act to change the level of the output bias voltage thereof.

It is, therefore, an object of the present invention to provide an improved differential amplifier arrangement.

It is a further object of the present invention to provide a differential amplifier with variable output voltage bias which bias is continuously variable over the full amplifier output voltage range.

It is yet a further object of the present invention to provide a differential amplifier with variable output voltage bias, which bias is continuously variable over the full amplifier output voltage range with the bias settings neither being influenced by nor disturbing closed-loop gain settings.

It is still yet a further object of the present invention to provide a high gain d.c. coupled amplifier with variable output voltage bias, which bias is substantially unchanged by adjustments or changes in the closed-loop gain of the amplifier.

It is another object of the present invention to provide a differential amplifier arrangement with variable output voltage bias which bias is continuously variable over the full amplifier output voltage range without substantially affecting the input common-mode voltage range and the common-mode rejection ratio.

In accordance with the amplifier output voltage biasing arrangement of the present invention, a pair of potentiometers, connected in parallel, are coupled in series in the feedback loop of an operational amplifier coupled to receive a differential input. A first constant current source is coupled to the wiper arm of a first potentiometer to insert current into the circuit and the second constant current source is coupled to the wiper arm of the second potentiometer to extract current from the circuit. By adjustment of the potentiometers, in an equal amount in opposite directions, the amplifier output voltage bias may be adjusted without disturbing other parameters of the amplifier arrangement. Moreover, changes in the closed-loop gain setting do not change the output voltage bias setting.

The foregoing and other objects, features and advantages of the invention will be apparent from the following more particular description of the preferred embodiments of the invention as illustrated in the accompanying drawings.

DETAILED DESCRIPTION OF THE DRAWINGS

Figure 1:
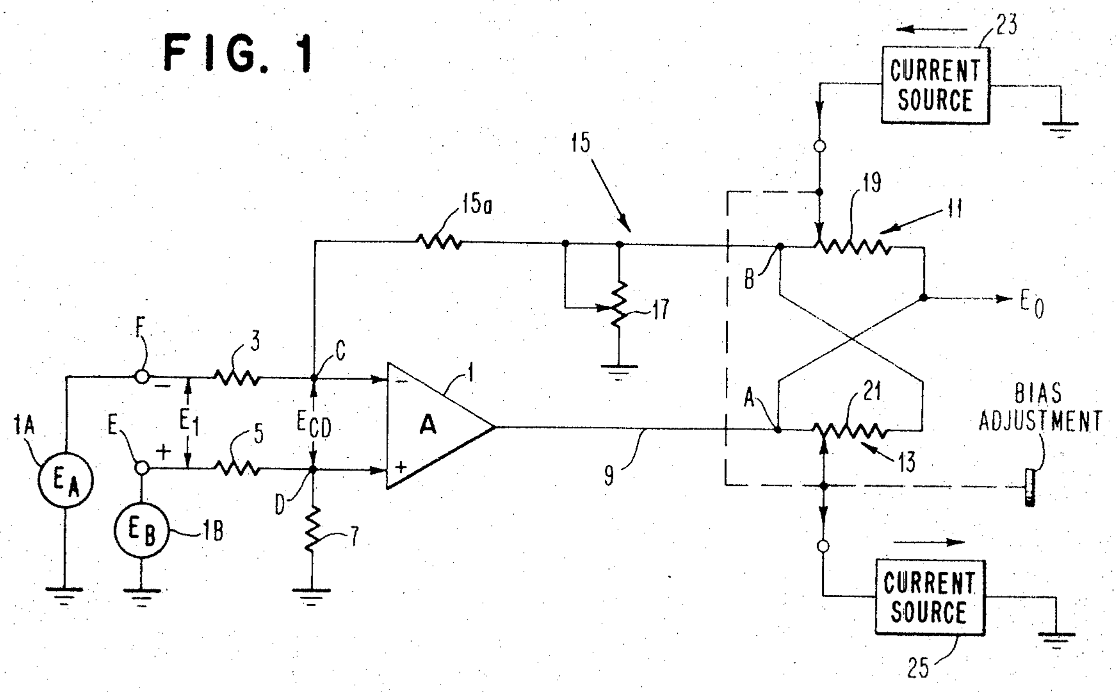
FIG. 1 shows a preferred embodiment of a differential amplifier arrangement having its output biased in accordance with the principles of the present invention.

As shown in FIG. 1, operational amplifier 1 receives, via resistors 3 and 5, a differential analog input signal $E_{CD}$ between its negative and positive input terminals C and D, which signal is derived from analog signal $E_1$. It is clear that operational amplifier 1 may be any of a variety of conventional high gain d.c. coupled operational amplifiers.

In the particular stable closed-loop differential amplifier mode of operation depicted in FIG. 1, the differential analog voltage input signal $E_1$ is applied between positive input terminal E, which is connected to one side of input resistor 5, and negative input terminal F, which is connected to one side of input resistor 3. As can be seen, the other side of resistor 5 is connected to ground, via resistor 7. Likewise, the other side of resistor 3 is connected to feedback loop 15. It should be recognized that the differential input signal represented by $E_1$ is the difference voltage between $E_B$ and $E_A$, taken from sources 1A and 1B, respectively. However, $E_1$ in fact may typically be derived from a thermocouple, for example. With respect to the output, $E_o$ at node A represents the amplified analog output signal obtained on output line 9 of operational amplifier 1. In order to obtain d.c. operating points on output line 9 other than zero, in accordance with the present invention, a pair of potentiometers 11 and 13 have been provided in feedback loop 15. It is clear that variable resistance 17 may be altered to selectively adjust the closed-loop gain of the feedback amplifier arrangement as shown.

Potentiometers 11 and 13 may be any of a variety of conventional potentiometers wherein a wiper arm may selectively be moved to any position along a resistor, such as resistors 19 and 21 in FIG. 1. Typically, potentiometers 11 and 13 may be realized by employing a conventional linear dual-potentiometer connected so that as both wiper arms move to the right, as shown in FIG. 1, they electrically approach nodes A and B, respectively. As shown by the dotted connecting lines, the wiper arms of the respective potentiometers may be mechanically linked so that a single mechanical movement appropriately moves the wiper arms on the respective resistors 19 and 21 to give the desired bias adjustment.

Figure 2:
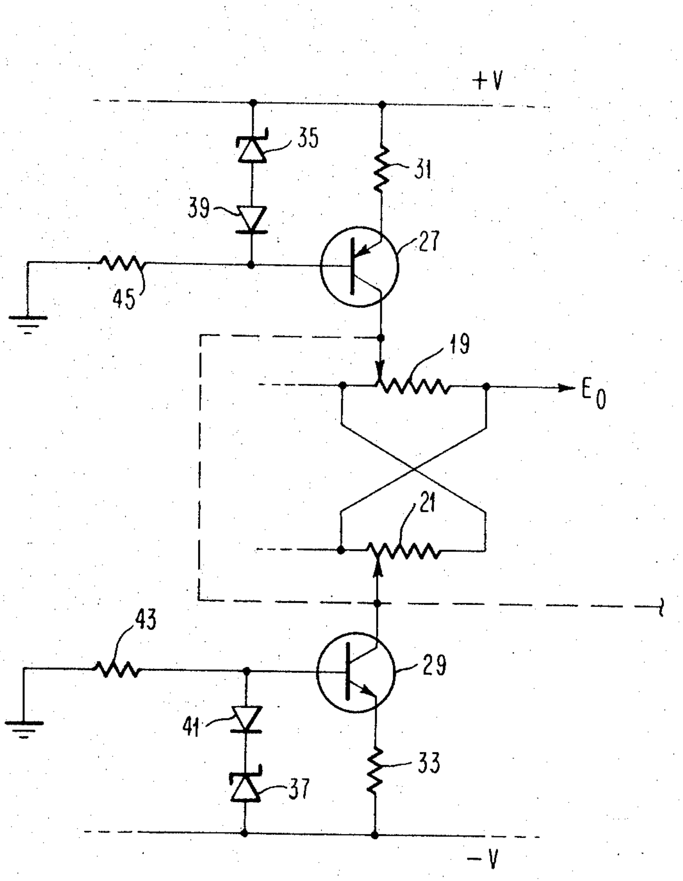
FIG. 2 shows a pair of active element current sources which may be used for the current sources, shown in FIG. 1.

In accordance with the present invention, a pair of current sources 23 and 25 are coupled, as shown in FIG. 1, to the respective wiper arms of potentiometers 11 and 13. As can be seen by the arrow associated with each of the current sources, current source 23 is oriented to insert current into feedback loop 15 and current source 25 is oriented to extract current from the loop. In FIG. 2 there is shown a pair of simple current sources using transistors, with the transistors being respectively designated 27 and 29. As is evident from the transistor symbols used therein, transistor 27 is a PNP transistor arranged to insert current into resistor 19 and transistor 29 is an NPN transistor arranged to extract current therefrom via resistor 21. Sensing resistors 31 and 33, in the respective emitter circuits of transistors 27 and 29, may typically be of the order of 3K ohms. Zener diodes 35 and 37 act to readily provide a constant bias voltage on the base of each of the respective current producing transistors. Diodes 39 and 41 function to compensate for temperature-induced variations in the base-emitter junction voltage of the respective transistors.

It is clear from FIG. 2, that with the base of the respective current producing transistors 27 and 29 held at a constant voltage potential by the respective zener diodes 35 and 37, a constant current source on one hand and sink on the other is created at the respective collector circuits thereof. This is so because any change in collector current, such as the collector current of transistor 27, will give rise to a corresponding change in voltage across sensing resistor 31. The voltage changed across resistor 31 will give rise to a corresponding voltage change across the base-emitter junction of transistor 27 which voltage change will restore the collector current to its original value. It should be recognized that the constant current devices of FIG. 2 are merely illustrative of current devices that may be used, and that any of a variety of constant current sources and sinks may readily be employed.

In accordance with the present invention, selected output voltage bias settings, over the full voltage range from positive to negative with respect to ground, may be achieved by appropriately adjusting potentiometers 11 and 13, as will be explained more fully hereinafter. Assume, for example, that the wiper arms of the respective potentiometers are set at some finite resistance, to the left of the resistance mid-point of each of resistors 19 and 21, as shown in FIG. 1. With such settings the output bias would be at a negative potential, with respect to ground. Alternatively, with each of the wiper arms at the resistance mid-point of the respective resistors 19 and 21, the output bias would be at zero volts. On the other hand, when the wiper arms of the respective potentiometers are to the right of the resistance mid-point, the output bias would be in the positive voltage range.

The operation of the amplifier arrangement of FIG. 1 may best be explained by initially assuming operational amplifier 1 has been zeroed, i.e., the intrinsic input voltage offset of the amplifier has been adjusted to zero, current generators 23 and 25 have been extinguished and the differential input voltage $E_1$ is set to zero. Accordingly, nodes A, B, C and D are at zero potential. With current source 23 now establishing a current of magnitude $I_0$ into resistance 19, any resultant deviation in potential at node B gives rise to a differential signal between nodes C and D. When the resultant differential signal between nodes C and D is amplified by the differential open-loop gain, $A_0$, the output of the amplifier is driven downwardly from 0 to $-I_0 R_P$ volts, where $R_P$ is the resistance of the parallel combination of resistors 19 and 21. Accordingly, the potential at node B is maintained at 0 volts, notwithstanding the injection of a current $I_0$, by virtue of the fact that a large voltage change $I_0 R_P$, of opposite polarity, is effected in the output circuit of amplifier 1 such as to remove a current from node A of equal magnitude to $I_0$. It is thus evident that the vast majority of current from current source 23 flows into the output circuit of amplifier 1 through output conductor 9, since any current flowing toward the input of amplifier 1 causes a very large voltage change, of opposite polarity, at the output thereof, thereby causing more of the inserted current to be drawn toward the output circuit.

Accordingly, it is clear that the system stabilizes with only a nominal amount of current flowing in feedback loop 15 toward the input to amplifier 1 and virtually all of the current quiescently flowing through resistances 19 and 21 into output conductor 9 of amplifier 1. Under the conditions thus far described where current source 25 is extinguished, the quiescent current flowing through resistances 19 and 21 into output conductor 9 of amplifier 1 is sunk by the amplifier itself to thereby effect a d.c. bias at node A, while node B remains at virtual zero potential. It should be noted that with current source 25 extinguished, the output may only be biased in the negative range.

Thus, it can be seen that where current source 25 is extinguished or not present, the output circuit of amplifier 1 itself acts as a current sink to extract current from the output biasing circuit. However, as an alternative to having the amplifier 1 output circuit sink the bias current, current source 25 may be arranged, as shown, to extract a current of a value equal to the bias current provided by current source 23. It should be recognized, here, that although in the preferred mode current source 25 is equal in value to current source 23, if in fact these current sources are of different value, the output circuit of amplifier 1 will act to either provide or sink the difference in current, depending respectively on whether current source 25 is larger or smaller in value than current source 23.

As hereinabove indicated, the current sink for extracting current may be implemented by employing a second potentiometer arrangement 13, mechanically linked to the first potentiometer arrangement 11. Thus, potentiometers 11 and 13 may be, in the preferred mode, conventional linear dual-potentiometers electrically connected, as shown. It is clear that use of the second potentiometer 13 allows the amplifier output voltage to be quiescently biased in the positive range, as well as the negative range. Accordingly, the amplifier output voltage may be quiescently biased across the full amplifier output voltage range. In addition, use of the second current source 25, and potentiometer 13, is advantageous from the stand point of obviating the need for the amplifier 1 output circuit to sink the bias current provided by current source 23.

It is noteworthy that with potentiometers 11 and 13 connected, as shown in the preferred embodiment of FIG. 1, a single mechanical movement will displace the wiper arms equal amounts in opposite directions to their commonly connected points. Resistances 19 and 21 are, of course, preferably of equal value. In addition, with the potentiometers connected, as shown in the preferred embodiment, the wiper arms are each initially referenced at complementary electrical positions on their respective resistors 19 and 21, such that when one wiper arm is at zero resistance the other is at maximum resistance with respect to the same common point and vice versa and, when one wiper arm is at the midpoint of its resistance so is the other.

The advantages of having the potentiometers arranged and connected in the manner described above will become more apparent when it is recognized that when so connected, current from source 23 is split in a divided manner so that equal amounts flow toward nodes A and B. Whether the current from current source 23 is divided in such equal amounts or not, the divided currents necessarily are recombined at the wiper arm of potentiometer 13, to be sunk by current source 25. It is clear that the reason the current from source 23 is equally divided when the potentiometers are connected in the manner described is because, irrespective of bias adjustment, each of the parallel branches between current source 23 and current source 25 exhibit the same impedance.

By having the current from current source 23 equally divided between each branch, the maximum range of bias voltage may be achieved for a given set of parameters, thereby providing optimum results. It can be seen that where the currents from source 23 do not divide equally between the branches it is not possible to obtain a net bias voltage equal to the full drop across one of the potentiometer resistors. Aside from the practical necessity of having potentiometers 11 and 13 mechanically linked to insure equally divided current between the biasing branches, a further advantage is seen, in that by so linking, a single or unique mechanical point exits for each bias value. Thus, by a single movement desired bias voltage levels may predictably be found. It can be appreciated that where potentiometers 11 and 13 are not mechanically linked there are many combinations of positions of the wiper arms for each bias voltage level.

It should be pointed out that since relatively little, if any, of the current introduced and removed by current generators 23 and 25 passes through feedback network 15 to the input as discussed above, then, under normal operating conditions where the loop gain $>>1$, the resistance of gain control resistor 17 necessarily can not influence the output voltage bias setting. Moreover, since current generators are employed in the bias control network, none of the parameters in the ideal closed-loop gain equation, $G = (R15a/R3)(1+R_P/R17)$, is perturbed as the output bias voltage is varied, where $R15a \infty$ the parallel resistance of $R_P$ and $R17$. It is to be understood that $R_P$ is the resistance value of the parallel combination of resistors 19 and 21, as hereinabove noted, and $R15a$, $R3$ and $R17$ are the resistance values of resistors 15*a*, 3 and 17, in FIG. 1. Thus, it can be seen that the bias and gain controls are completely independent of one another to the extent that the loop gain $A_0\, R3\, R17/R15a(R_P+R17)$ remains $\infty$ 1.

The above implies $R17$ cannot be made arbitrarily small without ultimately reducing the loop gain, thereby giving rise to interdependence between the gain and bias control. The following table provides a list of typical parameter values that may be employed for the various elements of the amplifier arrangement and current sources, in accordance with the principles of the present invention.

TABLE I

| ELEMENT | VALUE |
|---|---|
| R3 | 1 M ohms |
| R5 | 1 M ohms |
| R7 | 5 M ohms |
| R15*a* | 5 M ohms |
| R17 | 5 K ohms |
| R19 | 10 K ohms |
| R21 | 10 K ohms |
| R31 | 3.1 K ohms |
| R33 | 3.1 K ohms |
| R43 | 1.3 K ohms |
| R45 | 1.3 K ohms |
| ZD35 | 6.2 V reverse breakdown |
| ZD37 | 6.2 V reverse breakdown |

While the invention has been particularly shown and described with reference to preferred embodiments thereof, it will be understood by those skilled in the art that the foregoing and other changes in form and details may be made therein without departing from the spirit and scope of the invention.

What is claim is:

1. An amplifier with variable output voltage bias comprising:

high gain d.c. coupled amplifier means having a pair of input terminals and an output terminal with said pair of input terminals coupled to receive a differential input signal;

first impedance circuit means coupled in a feedback path between said output terminal and one of said pair of input terminals, said first impedance circuit means including potentiometer means having first and second terminals defining a fixed impedance in series with said feedback path and variable impedance tap means for inserting current thereto;

constant current source means coupled to said variable impedance tap means for inserting constant current thereto to establish quiescent current flow between said source means and said output terminal so as to thereby establish a quiescent bias on said output terminal wich is continuously adjustable through adjustment of said variable impedance tap means over the full range of said amplifier output; and second impedance circuit means coupled to said output terminal and being variable in response to the adjustment of the said variable impedance tap means of said first impedance circuit means for thereby extracting the said quiescent current flowing between said source means and said output terminal.

2. The amplifier as set forth in claim 1 wherein said current flows from said source means into the output circuit of said high gain amplifier means to thereby establish a negative quiescent bias on said output terminal.

3. The amplifier as set forth in claim 2 wherein said second impedance circuit means also includes potentiometer means having first and second terminals connected respectively to the said first and second terminals defining the said fixed impedance path in said first impedance circuit means and having a variable impedance tap means coupled to a further constant current source means, said further constant current source means oriented to extract current from said second circuit means in an amount equal to said inserted current.

4. The amplifier as set forth in claim 3 wherein the first and second recited potentiometer means are coupled together so that adjustment of one causes a corresponding adjustment of the other whereby a single bias adjustment position exists for each possible output bias voltage level.

5. The amplifier as set forth in claim 4 wherein each of the recited pair of current source means comprise a transistor having a fixed bias voltage on the base thereof and a sensing resistance in the emitter circuit thereof so as to thereby effect a constant current in the collector circuit thereof coupled to the respective variable impedance tap means therefor with the conductivity type of one transistor being opposite to that of the other.

6. An analog voltage amplifier with variable output voltage bias which bias is continuously variable over the full amplifier range comprising:

operational amplifier means having a pair of input terminals coupled to receive a differential input signal and an output terminal;

feedback circuit means coupled between said output terminal and one of said pair of input terminals, said feedback circuit means including first and second potentiometer means each having first and second terminals defining a fixed impedance and a third terminal defining a variable impedance tap, said first and second potentiometer means arranged in said feedback circuit means so that the respective fixed impedances of said first and second potentiometer means are coupled in parallel with the parallel connected fixed impedances coupled in series in the feedback circuit from said output terminal to the said one of said pair of input terminals; and first and second current source means coupled to the respective third terminals of said first and second potentiometer means, said first current source means oriented so that a quiescent current flows therefrom towards said output terminal and said second current source means oriented so that a current equal to said quiescent current flows from said output terminal thereto so as to thereby provide a quiescent bias on said output terminal, adjustable over the full range of said amplifier output without affecting operation of the amplifier.

7. The amplifier as set forth in claim 6 wherein said first and second potentiometer means are coupled together such that adjustment of one causes a corresponding adjustment so as to thereby provide a unique adjustment position for each bias voltage level.

8. The amplifier as set forth in claim 7 wherein said first current source means comprises a transistor of one conductivity type having a sensing resistance in its emitter circuit and a fixed potential on its base so as to provide a constant current source at its collector circuit for said first potentiometer means and said second current source means comprises a transistor of opposite conductivity type to said one conductivity type having a sensing resistance in its emitter circuit and a fixed potential on its base so as to provide a constant current sink at its collector circuit for said second potentiometer means.

* * * * *